W. O. KENNINGTON.
ARTICLE COMPOSED PARTLY OF RUBBER OR THE LIKE.
APPLICATION FILED MAY 25, 1914.

1,218,568.

Patented Mar. 6, 1917.
3 SHEETS—SHEET 1.

Witnesses:

Inventor:
William Oscar Kennington

W. O. KENNINGTON.
ARTICLE COMPOSED PARTLY OF RUBBER OR THE LIKE.
APPLICATION FILED MAY 25, 1914.

1,218,568.

Patented Mar. 6, 1917.
3 SHEETS—SHEET 2.

Witnesses:

Inventor:
William Oscar Kennington

W. O. KENNINGTON.
ARTICLE COMPOSED PARTLY OF RUBBER OR THE LIKE.
APPLICATION FILED MAY 25, 1914.

1,218,568.

Patented Mar. 6, 1917.
3 SHEETS—SHEET 3.

Witnesses:

Inventor:
William Oscar Kennington

UNITED STATES PATENT OFFICE.

WILLIAM OSCAR KENNINGTON, OF ANDERSON, INDIANA, ASSIGNOR TO REMY ELECTRIC COMPANY, OF ANDERSON, INDIANA.

ARTICLE COMPOSED PARTLY OF RUBBER OR THE LIKE.

1,218,568. Specification of Letters Patent. Patented Mar. 6, 1917.

Application filed May 25, 1914. Serial No. 840,969.

*To all whom it may concern:*

Be it known that I, WILLIAM OSCAR KENNINGTON, a subject of the King of England, residing at Anderson, in the county of Madison and State of Indiana, have invented a certain new and useful Improvement in Articles Composed Partly of Rubber or the like, of which the following is a specification.

My invention relates to articles composed partly of rubber and partly of other solid material, particularly that class of materials frequently known as phenolic condensation products, such as bakelite and condensite. In addition thereto, parts composed of other materials, such as metals may be included in the product.

It is frequently desirable to employ an article having certain portions of its surface composed of hard rubber, on account of the physical or chemical properties of this material, and having certain portions composed of material other than hard rubber.

As an example of the usefulness of my invention, I will describe and illustrate its application to electrical apparatus and explain the advantages resulting therefrom. I do not limit its application to such uses however, as it can be employed for a great variety of other purposes.

In electrical apparatus, circuit controlling arrangements are often employed wherein a conductor, such as a brush, slides over a surface, portions of which are of insulation material, and other portions of which are of conducting material. It is frequently desirable to employ a single part including conductor or conductors, and also the insulation material associated therewith. Such a part will be referred to herein frequently as a contact member, and the part which slides over the surface thereof, as the brush. The portions of the contact member surface over which the brush slides will be known as the contact surface. It is, of course understood that said sliding action is produced by the relative motion of the brush and the contact member, and it is immaterial to the purpose of the invention whether the brush or the contact member moves or whether they both move.

A contact member, to be satisfactory, should be composed of insulating material of suitable dielectric strength and this insulating material should also be of such mechanical strength and rigidity as to withstand breakage or distortion under the conditions under which it is employed. It is further essential that the insulating portions of the contact surface shall be of such physical and chemical properties that the movement of the brush over said surface together with the electrical phenomena present shall not destroy or impair the insulating properties of this surface or produce other undesirable results.

In constructing a distributer for ignition apparatus for internal combustion engines, I desired to employ a contact member which had such dielectric strength as to enable it to be used in the secondary circuit of an induction coil, and which also, even when subjected to the heat present in the neighborhood of an internal combustion engine, still had sufficient mechanical rigidity to prevent warping or breaking. A contact member having a body molded of the material commercially known as condensite proved satisfactory, both as regards its ability to resist break-down, due to the electric pressure present, and in its mechanical strength and rigidity, even when subjected to the heat in the neighborhood of an engine. However, I employed a brush sliding over the surface of the contact member and engaging alternately the insulating material and the conducting material of which said contact member is composed. It was found that the sliding of the brush over the contact surface in this manner injured the insulating properties of the surface of the contact member over which it slid, when this surface was composed of condensite. The probable cause of such injury to the insulating properties is arcing between the brush and the conducting parts of the contact member. This is, of course, very objectionable, particularly when the voltages used in the ignition circuits of jump spark ignition systems are present, for it permits said voltages to produce currents in other than the intended paths. Hard rubber, it was found, did not show the objectionable results above mentioned, and was therefore satisfactory in this respect. Hard rubber, however, is liable to warp and become distorted when subjected to the heat in the neighborhood of the engine, and for this reason a contact member, the insulating material of which was wholly hard rubber, was not satisfactory. This led me to use a contact member having the greater part of it composed of condensite but with the insulating portions of the contact surface of hard rubber, so that I obtained a contact member having the mechanical strength and rigidity of condensite, but with the advantage of having the insulating part of the contact surface of hard rubber. By making the hard rubber sufficiently thin and mechanically securing it to the other parts of the contact member, the tendency of the hard rubber to distort was obviated. The process of making such a distributer contact member is described in detail herein for illustrating my method, but it will be understood that the same method may be used in the production of numerous other articles and I do not limit myself to the particular use of the method which I have herein described.

Referring to the drawings:

Figures 1, 2, and 3 show a contact member made in accordance with my invention, Fig. 1 being a section along the line 1—1 of Fig. 2, Fig. 2 being a top view of Fig. 1, and Fig. 3 being a bottom view of Fig. 1.

Figs. 4, 5, 6, 7, and 8 are certain pieces used in making an article similar to that shown in the preceding figures.

Figure 2:
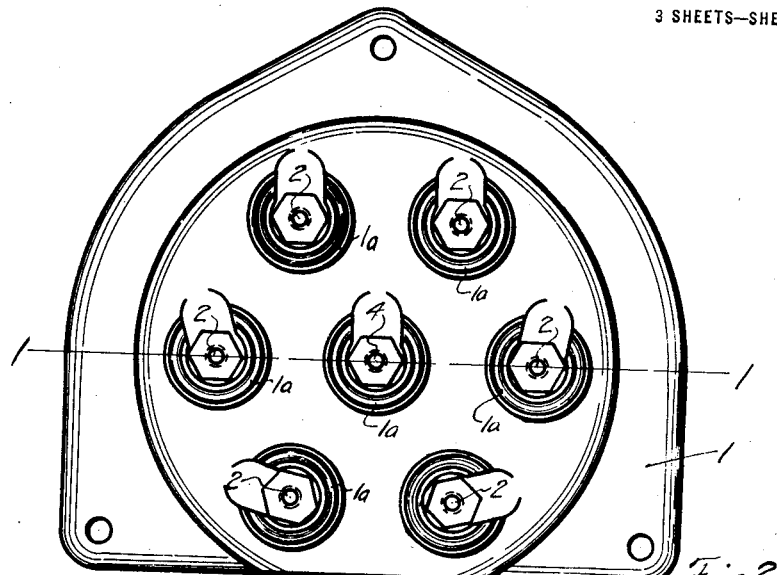
Figure 1:
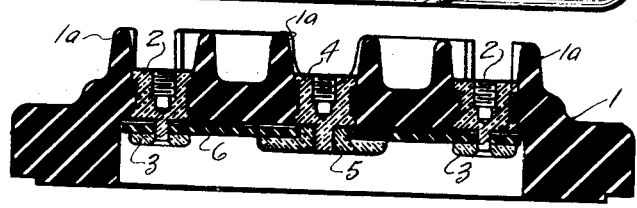
Figure 3:
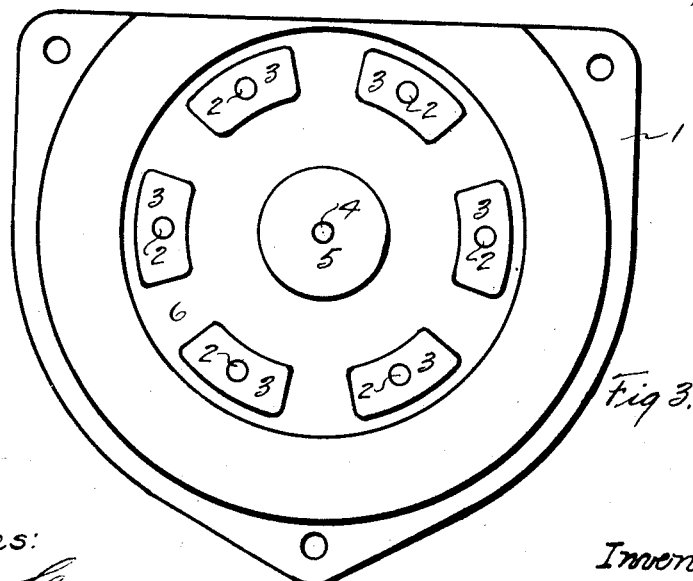

Referring to Figs. 1, 2 and 3, 1 is the body of the article, and is composed of condensite or the like. Condensite, as is well known, is a material from which hard articles can be molded, and is extensively used in the manufacture of electrical apparatus as an insulator. In this condensite body are contact anchors 2, 2, etc., these being shown as having certain portions of hexagonal cross section in order to prevent their turning in said condensite. Riveted to these anchors are the heads 3. The contact anchors have tapped holes for the reception of screws whereby electrical connections may be made. To provide a means for holding the wires which are screwed to said contact anchors, when said contact member is in use, in their proper positions relative to the body 1, C shaped projections 1ª are shown as forming a part of the body 1. In addition to the above described contacts, including the anchors and head, which I term peripheral contacts, there is a central contact composed of the contact anchor 4 and contact head 5, of the same general construction as the corresponding parts 2 and 3 of the peripheral contact, with the exception of the shape of the head. There is a layer of hard rubber 6 which is introduced particularly for the purpose of providing a rubber surface between the adjacent peripheral contact heads 3. This rubber extends inwardly to a reduced portion of the central contact head 5. In the use which is made of this contact piece, one brush held by a rotating brush holder rests against the central contact, and another brush revolves so as to pass alternately over a peripheral contact and the hard rubber surface between two peripheral contacts, the presence of the hard rubber giving the advantages heretofore explained.

The general method of manufacture consists in assembling in a suitable mold, the metal parts of the article, if any, together with unvulcanized rubber or the like and a suitable form of condensite, bakelite, or the like, and subjecting the whole to heat and pressure.

The rubber and the condensite have, when placed in the mold, but roughly the form which they will have in the finished product. Each of these components may be placed in the mold as a single piece or as a plurality of pieces according to convenience. A form of condensite which I have employed successfully is known to the trade as #116 natural plastic condensite. This is obtained in sheets. This material is solid at ordinary temperatures, but when subjected to the hereinafter described heat and pressure treatment, becomes plastic, so that it flows to the various parts of the mold and becomes accurately instead of roughly the shape of the cavity of the mold. It also becomes hard so that heating thereafter will not cause it to soften.

Figure 4:
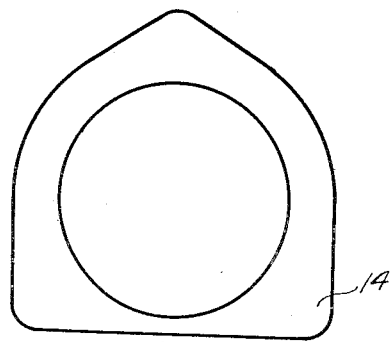
Figure 6:
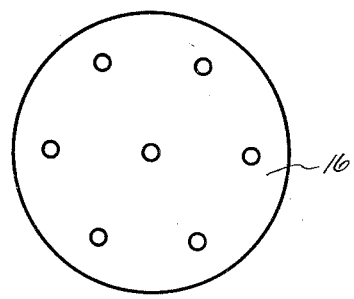
Figure 8:
Figure 5:
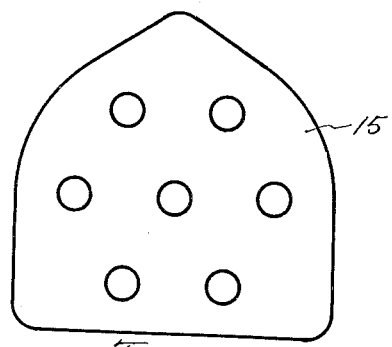
Figure 7:
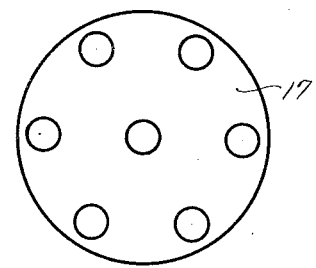

For producing an article similar to that shown in Figs. 1, 2 and 3, the parts 14, 15 and 16, shown in Figs. 4, 5 and 6, respectively, are cut from the condensite sheets, and the parts 17, and 18 shown in Figs. 7 and 8 respectively are cut from sheet rubber (unvulcanized).

Figure 9:
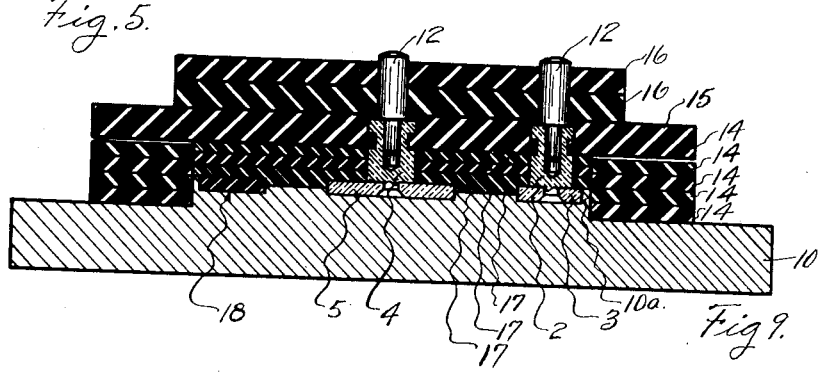
Fig. 9 shows the condensite, rubber and metal parts assembled on the lower portion of the mold, the left hand portion being a section along a radius between two of the hereinafter described peripheral contacts, and the right hand portion being a section along a radius through the center of one of said peripheral contacts.

Referring to Fig. 9, 10 is the lower portion of a mold, on which are assembled these various parts, together with the metal parts, as described below in detail.

The contact heads 3 and 5, which have already been attached to their respective anchors 2 and 4 are placed in position, 5 being located in a central hole and 3 being placed in an annular groove in the mold. In said annular groove between the contact heads, pieces of unvulcanized rubber 18 are placed. Thus, in said annular groove, the contact heads 3 alternate with the rubber pieces 18. A suitable number of soft rubber disks 17, 17, 17 are placed in position, the contact anchors 2, passing through their perforations. The condensite pieces 14, 14, 14, are placed in position about the portion 10ª of the mold, corresponding to the large recess in the finished product. Pins 12, 12, having reduced lower ends, are inserted in the contact anchors 2 and 4. Condensite pieces 15 and 16 are then placed in position, with pins 17 passing through their perforations. The general contour of the space occupied by the condensite and the rubber is roughly similar to that which they will occupy in the finished product. It is only roughly so however, as cracks or interstices may exist between various parts and the height is somewhat greater than in the finished product.

Figure 10:
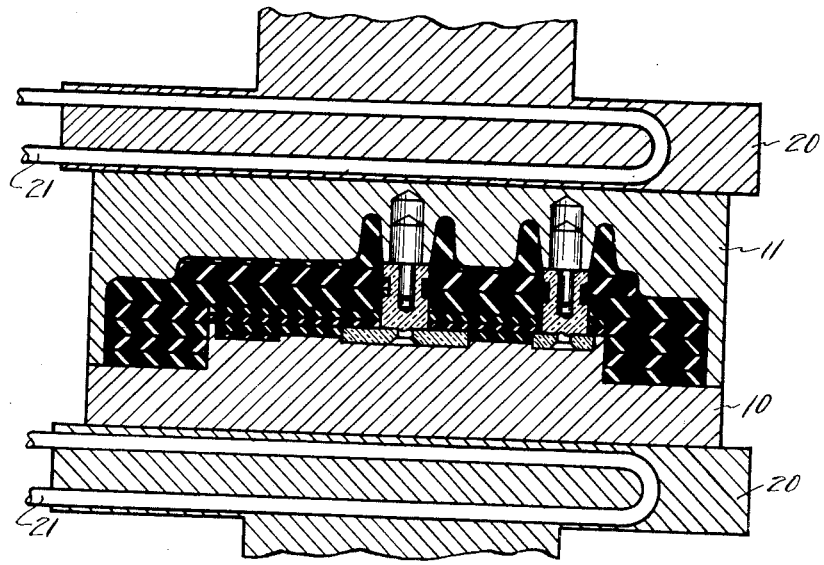
Fig. 10 shows the completed article in the mold, being shown in section, similar to Fig. 9.

The upper part 11 of the mold, as shown in Fig. 10, is placed in position. Suitable holes in said part locate pins 12 and thereby the metal parts 2, 2, etc., and 4. The mold with its contents is placed in a suitable hydraulic press, having jaws 20, 20, heated by steam passing through suitable channels 21, 21. Pressure is applied, which forces the two parts 10 and 11 of the mold together, the excess condensite oozing out between the two portions of the mold, and the mold is maintained at a suitable temperature by steam in the channels 21, 21.

The heating causes the condensite and rubber to become plastic, and sticky, so that the pressure on the two parts of the mold causes these materials to become compact, to adhere to one another, and to fill up the various interstices of the mold. The parts of the mold continue to approach each other under the action of the pressure until they abut one another, the excess material having passed out of the joint between said parts.

After the condensite and the rubber have become plastic and sticky, further action of the heat and pressure causes the rubber and the condensite to become hard. After this has taken place the article is removed from the mold, the mold first being allowed to cool, as a matter of convenience in handling. The article is then complete, as far as the special process of manufacture herein described is concerned. If desired, however, the article may be machined or have other similar work done thereon.

Figure 11:
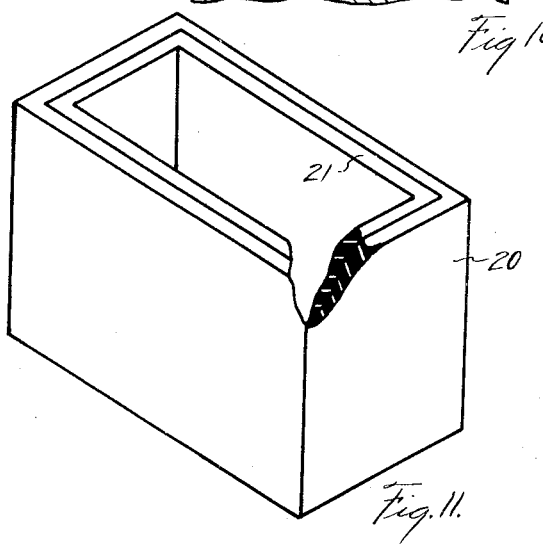
Fig. 11 shows a container made in accordance with my invention.

Referring to Fig. 11, there is a body or casing 20, composed of condensite or similar material, and a lining 21, of hard rubber. Such a container possesses the rigidity of the molded condensite, but may be used for the reception of chemicals which could not be kept in condensite vessels on account of their action thereon.

It is understood, of course, that the terms rubber and condensite used in the foregoing description do not necessarily refer to these articles in the pure state, but preferably to the mixture of these substances with such materials as will render them suitable for the above described processes, such mixtures being well known materials of commerce.

Although in describing my process, I have made especial reference to condensite, I do not limit myself to this particular material, as other materials of suitable properties may be employed instead. Among such other materials are other phenolic condensation products.

I claim as my invention:

1. The method of forming an insulating article, comprising the separate placing in a mold of distinct bodies of unvulcanized rubber and other material capable of flowing and subsequently hardening under the action of heat and pressure, and the subjecting of the whole to heat and pressure.

2. The method of forming a contact member, comprising the separate placing in a mold of metal of a body of a phenolic condensation product adapted to become soft and plastic and then harden when subjected to heat, and a distinct mass of unvulcanized rubber, and the subjecting of the same to heat and pressure, whereby said phenolic condensation product and said rubber become plastic and subsequently hard.

3. The method of forming an insulating article by placing separately in a mold a distinct body of rubber having metallic contacts embedded therein and together adapted to form a contact surface, and a distinct mass of phenolic condensation product and then subjecting the mold to heat, to mold and harden the condensation product into close association with the rubber and the metallic contacts.

4. The method of forming an insulating article, comprising the separate placing in a mold of a distinct body of rubber to form a contact surface, thereafter placing in the mold a distinct body of phenolic condensation product and thereafter subjecting the whole to heat and pressure to harden the condensation product and weld the said product securely together with the distinct rubber portion forming the contact surface.

5. The method of forming an insulating article, which comprises the separate placing in a mold of a distinct body of rubber to form a contact surface adapted to coöperate with a rotary distributer brush, thereafter placing in the mold a distinct mass of plastic phenolic condensation product, and thereafter subjecting the mold and the rubber and condensation product contained therein to the action of sufficient heat and pressure to cause the plastic condensation product to flow into the interstices of the mold and subsequently harden into close association with the rubber portion forming the contact surface.

6. The method of forming an insulating article, comprising the simultaneous molding together of a main body portion composed of phenolic condensation product and a contact surface therefor composed of rubber.

Signed at Anderson in the county of Madison, and State of Indiana, this 23rd day of May, 1914.

WILLIAM OSCAR KENNINGTON.

Witnesses:
JNO. S. MILTON,
JOHN A. VANNIMAN.